United States Patent
Wang et al.

(10) Patent No.: US 8,721,151 B2
(45) Date of Patent: May 13, 2014

(54) MULTI-DOMAIN DYNAMIC-DRIVING BACKLIGHT MODULE

(75) Inventors: Tzu-Chang Wang, Chu-Nan (TW); Li-Wei Mao, Chu-Nan (TW); Hui-Hung Liang, Chu-Nan (TW)

(73) Assignees: Innocom Technology (Shenzhen) Co. Ltd., Shenzhen (CN); Chimei Innolux Corporation, Chu-Nan (TW)

( * ) Notice: Subject to any disclaimer, the term of this patent is extended or adjusted under 35 U.S.C. 154(b) by 125 days.

(21) Appl. No.: 13/536,962

(22) Filed: Jun. 28, 2012

(65) Prior Publication Data

US 2013/0021819 A1    Jan. 24, 2013

(30) Foreign Application Priority Data

Jul. 19, 2011    (TW) .............................. 100125390 A

(51) Int. Cl.
*F21V 7/04* (2006.01)
*G02B 6/24* (2006.01)

(52) U.S. Cl.
CPC ................ *G02B 6/24* (2013.01); *G02B 6/0078* (2013.01)
USPC .......... 362/616; 362/617; 362/620; 362/97.3; 362/612

(58) Field of Classification Search
USPC ......... 362/616, 617, 620, 97.1, 97.3, 11, 612; 349/58, 65
See application file for complete search history.

(56) References Cited

U.S. PATENT DOCUMENTS

| 7,530,723 | B2* | 5/2009 | Ohno | 362/613 |
|---|---|---|---|---|
| 7,784,989 | B2* | 8/2010 | Shin | 362/628 |
| 8,322,904 | B2* | 12/2012 | Lee et al. | 362/613 |
| 2006/0114694 | A1* | 6/2006 | Cho et al. | 362/631 |
| 2006/0274547 | A1* | 12/2006 | Kao et al. | 362/560 |
| 2009/0086486 | A1 | 4/2009 | Hsieh et al. | |
| 2011/0026239 | A1 | 2/2011 | Kim et al. | |
| 2011/0141396 | A1* | 6/2011 | Nakamura et al. | 349/62 |
| 2012/0081918 | A1* | 4/2012 | Yang et al. | 362/608 |

FOREIGN PATENT DOCUMENTS

EP    2124078    11/2009

* cited by examiner

*Primary Examiner* — Ali Alavi
(74) *Attorney, Agent, or Firm* — Liu & Liu

(57) ABSTRACT

A multi-domain dynamic-driving backlight module is provided, which includes a bezel, a reflective plate, a plurality of light emitting units, and a plurality of light guide plates. The reflective plate is disposed on the bezel. The light guide plates respectively have a short side and a long side extending in a predetermined direction, wherein each of the light emitting surfaces of the light guide plates includes a plurality of patterned structures extending in a direction parallel to the light projection direction of the light emitting units. Each of the light emitting surfaces includes a patterned surface includes a plurality of patterned structures extending in a direction parallel to the light projection direction of the light emitting units.

14 Claims, 9 Drawing Sheets

MULTI-DOMAIN DYNAMIC-DRIVING BACKLIGHT MODULE

CROSS REFERENCE TO RELATED APPLICATIONS

This Application claims priority of Taiwan Patent Application No. 100125390, filed on Jul. 19, 2011, the entirety of which is incorporated by reference herein

BACKGROUND OF THE INVENTION

1. Field of the Invention

The invention relates to a backlight module, and more particularly, to a multi-domain dynamic-driving backlight module.

2. Description of the Related Art

Liquid crystal display devices are already widely used in all kind of electronic devices, such as LCD TVs and computers. Key advantages are low electricity consumption, low driving voltage, and the possibility for electronic devices to be designed with lighter weights and thinner sizes. However, the liquid crystal display panel in the liquid crystal display devices cannot emit light by itself, and have to be paired with a back light unit to light the screen evenly.

Nowadays, LEDs (Light Emitting Diode, hereinafter LED) employed as backlight sources of liquid crystal panels are operated in fully dim or fully bright modes. However, in order to increase contrast characteristics, in a multi-domain dynamic-driving backlight technique, the LEDs are locally controlled depending on an image which is displayed.

Please refer to FIG. 1, which shows a schematic view of a prior art dynamic backlight module 1. LEDs 20A, 20B, and 20C are disposed on the upper, middle, and lower regions of a bezel 10, and the light guide plate 30 is disposed on the middle region of the bezel 10. While a display block A is required to show images, the LED 20B is turned on, and the LEDs 20A and 20C are turned off. However, since the light distribution pattern of the LED can not be effectively concentrated by the light guide plate, a fan-shaped lightened area is formed in display block E. Thus, the desire of local dimming control cannot be fulfilled.

BRIEF SUMMARY OF THE INVENTION

In this regard, the main objective of the present invention is to provide a backlight module, wherein a plurality of light emitting units, disposed at the displaying region, are independently controlled, and a plurality of light guide plates, with a patterned surface thereon, are disposed relative to the light emitting units, so as to overcome the drawbacks in the prior art.

To achieve the objective mentioned above, the present invention provides a multi-domain dynamic-driving backlight module, which includes a bezel, a reflective plate, a plurality of light emitting units, and a plurality of light guide plates. The reflective plate is disposed on the bezel. The light guide plates respectively have a short side, and a long side extending in a predetermined direction, and each of the light guide plates includes a light incident surface, a light emitting surface, and a bottom surface. The light emitting surface is adjacent to the light incident surface, and the bottom surface is opposite to the light emitting surface and connected to the reflective plate. The light incident surface corresponds to the light projection direction of the light emitting units, and the light emitting surface includes a patterned surface.

The patterned surface of each of the light guides includes a plurality of patterned structures extending in a direction parallel to the light projection direction of the light emitting units. In one embodiment, the patterned structures include a plurality of lenticular embosses extending in the light projection direction of the light emitting units. In addition, the light guide plate includes a plurality of diffusion particles dispersed between the light emitting surface and the bottom surface.

In one embodiment, the number of the reflective plate is more than one, and on a first plane, the reflective plates are arranged in the predetermined direction. At least some of the reflective plates include an extension portion, and each of the extension portions extends from the first plane in a direction away from the bezel to a second plane. The extension portions are disposed between the light guide plates and extend for a predetermined distance in the predetermined direction.

A plurality of chambers are respectively defined between the extension portions and the neighboring reflective plates, wherein the light emitting units are disposed in the chamber, and parts of the light guide plates are disposed in the chambers.

The bezel further comprises a plurality of positioning holes, wherein a plurality of bolts are respectively passed through the light guide plates, the reflective plate and the positioning holes so as to position the light guide plates and the reflective plate on the bezel, wherein the positions where the bolts are disposed are interspersed with the positions where the LEDs are disposed. In addition, at least one diffusion plate is disposed on the bolts relative to the light emitting surfaces of the light guide plates, wherein an air gap is formed therebetween.

In the other embodiment, the bezel includes a plurality of positioning holes, and the light guide plates respectively include a plurality of slots corresponding to the positioning holes, wherein the slots are disposed on the light incident surface of the light guide plate and a side surface opposite to the light incident surface. Each of the slots has two small sides and a large side located between the two small sides, and the manufacturing tolerance of the large side of each of the slots are larger than the manufacturing tolerance of the two small sides of each of the slots.

Because the multi-domain dynamic-driving backlight module of present invention includes a plurality of light emitting units disposed at the displaying region, and the light therefrom is concentrated by the patterned structures disposed on light emitting surface of the light guide plate, the objective to design a multi-domain dynamic-driving display with high contrast and high gray level characteristics can be achieved.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 3:
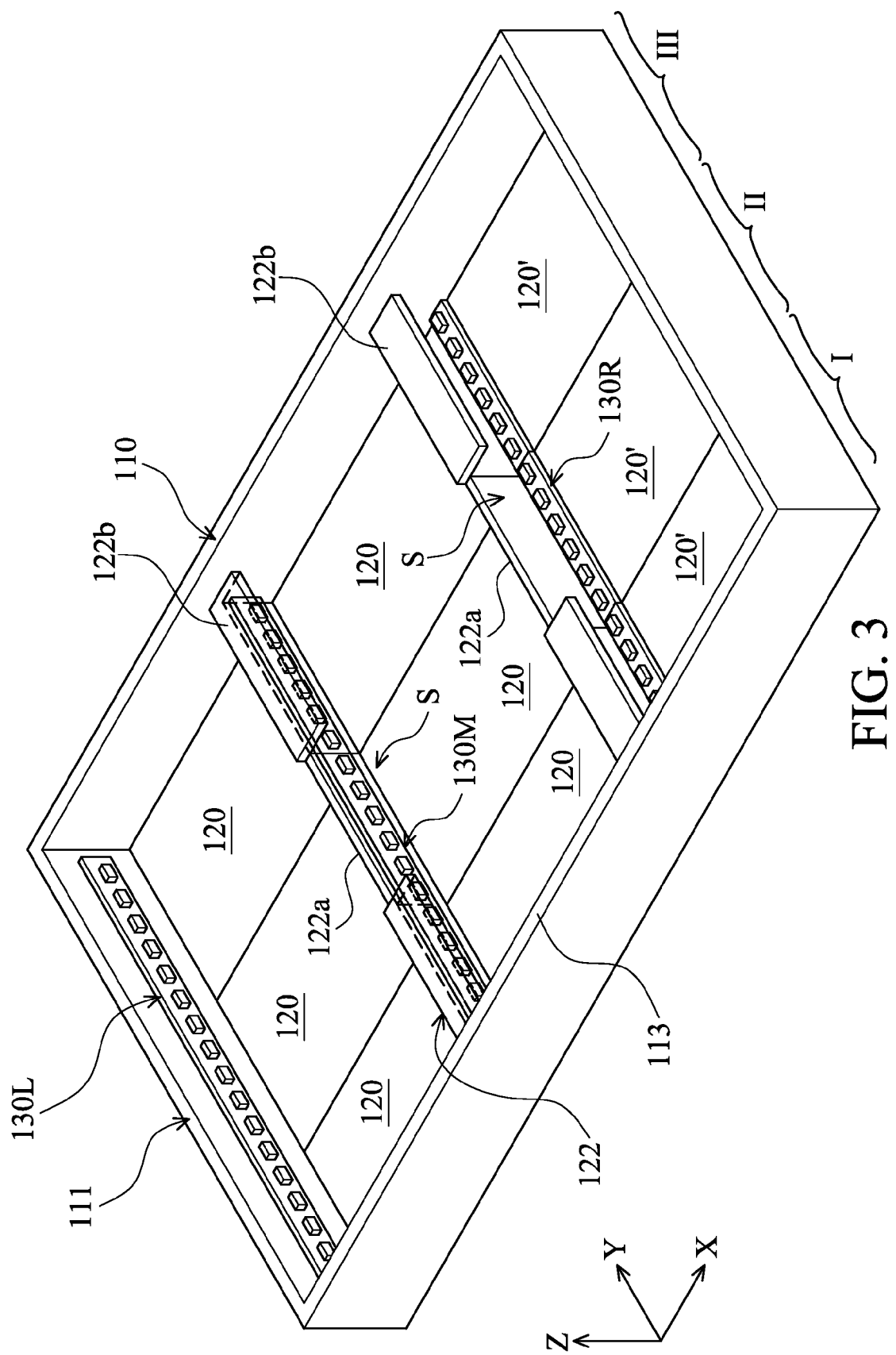
FIG. 3 depicts a partial schematic view of the multi-domain dynamic-driving backlight module in accordance with the first embodiment of the invention.
Figure 4:
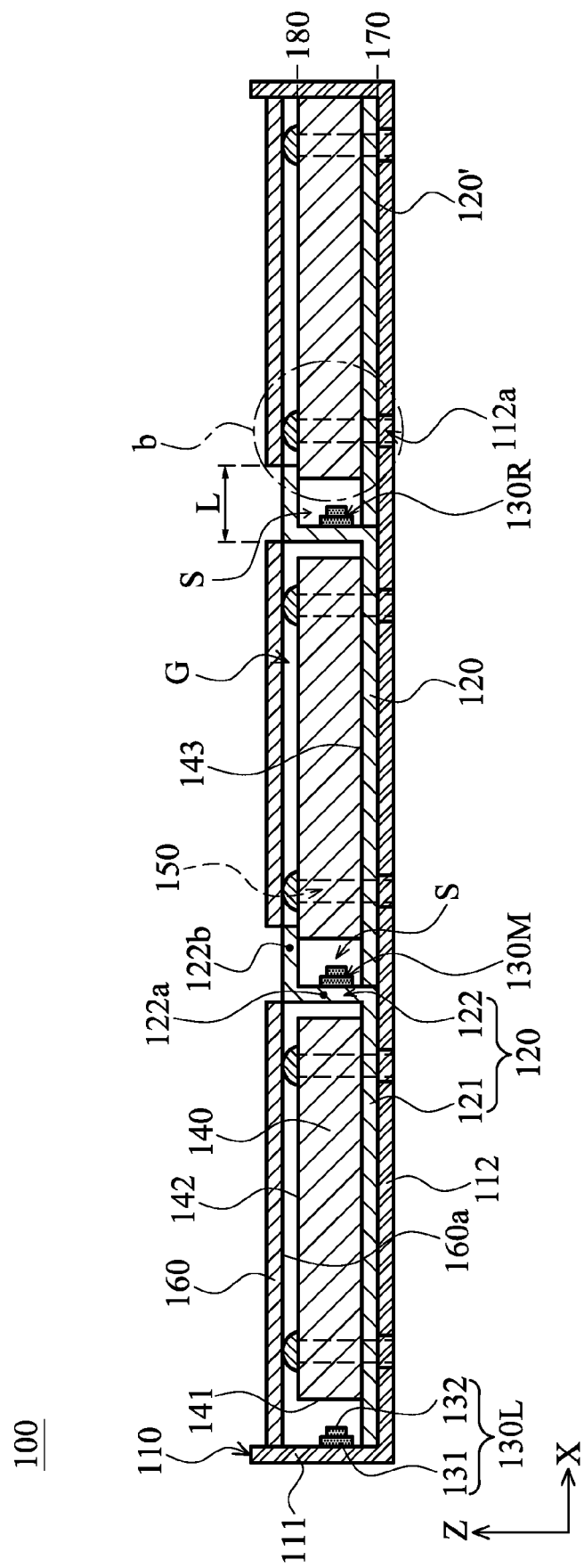
FIG. 4 depicts a cross-sectional view of a-a section which is observed along a Y direction of FIG. 2.

The following description is of the best-contemplated mode of carrying out the invention. This description is made for the purpose of illustrating the general principles of the invention and should not be taken in a limiting sense. The scope of the invention is best determined by reference to the appended claims Please refer to FIGS. 2-4, wherein FIG. 4 shows a sectional view of a-a section which is observed along a Y direction of FIG. 2. For purpose of illustration, the diffusion plate 160 is omitted in FIG. 2, and only the bezel 110, the reflective plates 120 and 120', and the light emitting units 130L, 130M and 130R are shown in FIG. 3, wherein the reflective plates 120 at the middle region II are represented by the first segments 122a.

A multi-domain dynamic-driving backlight module 100 of a first embodiment of the present application includes a bezel 110, a plurality of reflective plates 120 and 120', a plurality of light emitting units 130L, 130M, and 130R, a plurality of light guide plates 140, a plurality of bolts 150, and a plurality of diffusion plates 160.

The reflective plates 120 and 120' are preferably made of material consisting of aluminum or aluminum-based alloys, so as to increase light uniformity of the backlight module 100. The two reflective plates 120 and one reflective plate 120' are consecutively arranged on the bottom surface 112 of the bezel 110 in a predetermined direction (X direction).

In one exemplary embodiment, the number of the above mentioned reflective plates 120 and 120' is three, and they are disposed on the lower region I, the middle region II, and the upper region III (observed in the order from the lower part of FIG. 2 to the upper part of FIG. 2) of the multi-domain dynamic-driving backlight module 100. That is, the backlight module 100 includes six reflective plates 120 and three reflective plates 120' (FIG. 3).

Each of the reflective plates 120 has a base portion 121 and a extension portion 122, wherein the bottom surface of the base portion 121 is connected to the bottom surface 112 of the bezel 110 (which will be described in detail later) and extends on a first plane 170 (FIG. 4). From the first plane 170, the extension portion 122 extends in a direction away from the bezel 110 (Z direction) to a second plane 180 (FIG. 4) and further extends for a predetermined distance L in the X direction. In one exemplary embodiment, the predetermined distance L is 5 mm, but it should not be limited thereto.

Specifically, each of the extension portions 122 includes a first segment 122a and a second segment 122b, wherein the first segment 122a is connected to the base portion 121, and the second segment 122b is connected to the top end of the first segment 122b and extends the predetermined distance L in X direction. A chamber S is formed between the second segment 122b of the extension portion 122 and the reflective plates 120 or 120' which are adjacent to the extension portions 122. The function and arrangement method of the reflective plate 120' are similar to that of the reflective plate 120; however, the reflective plate 120' lacks the extension portion 122 like the reflective plate 120.

In one exemplary embodiment, each of the light emitting units 130L, 130M, and 130R respectively includes a substrate 131 and a plurality of LEDs 132. The substrate 131 is a circuit board used to independently control the switching of the LEDs 132 at the lower region I, the second region II, and the third region III of the multi-domain dynamic-driving backlight module 100. The light emitting units 130L are disposed on the inner surface of the short side 111 of the bezel 110 (which will be described in detail later), and the light emitting units 130M and the light emitting units 130R are disposed in the chamber S. Specifically, the light emitting units 130M and the light emitting units 130R are respectively disposed on the side wall of the first segment 122a of the extension portion 122 of the reflective plates 120. The light emitting units 130L, 130M, and 130R project light toward to the predetermined direction (X direction).

Figure 1:
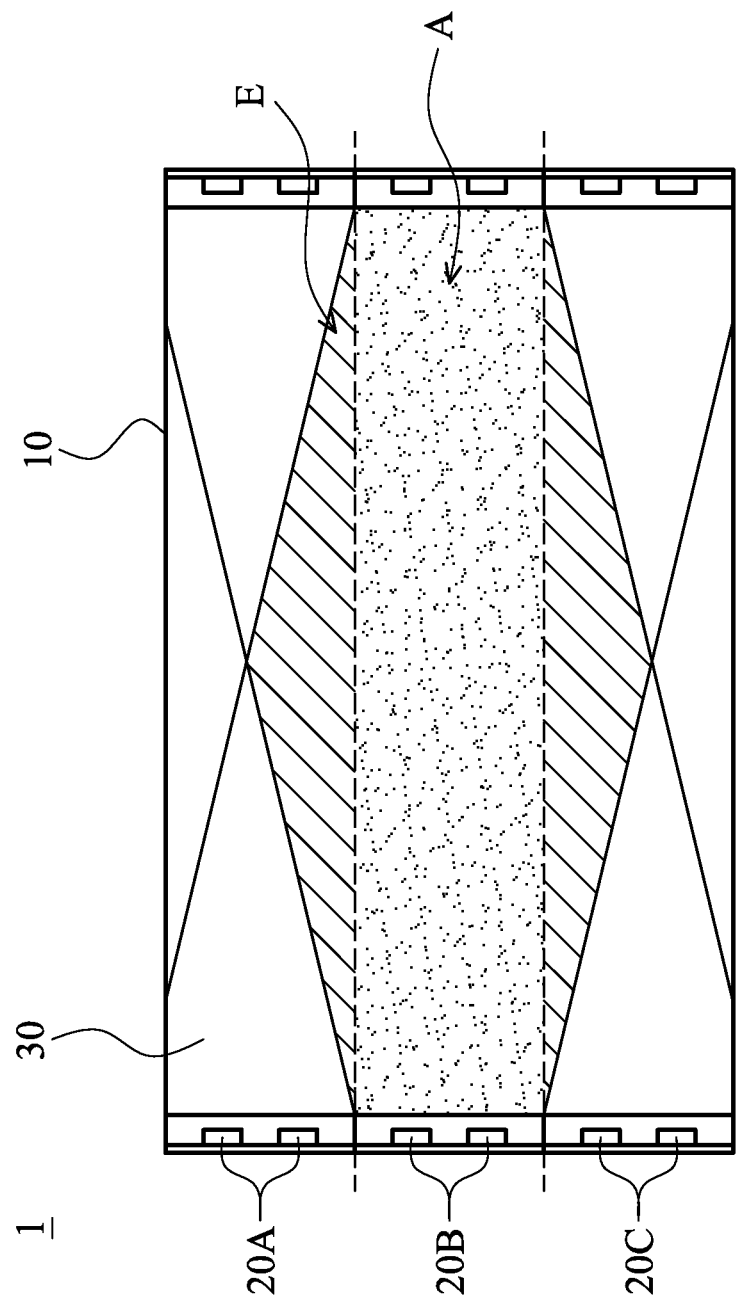
FIG. 1 depicts a schematic view of a conventional multi-domain dynamic-driving backlight module.
Figure 2:
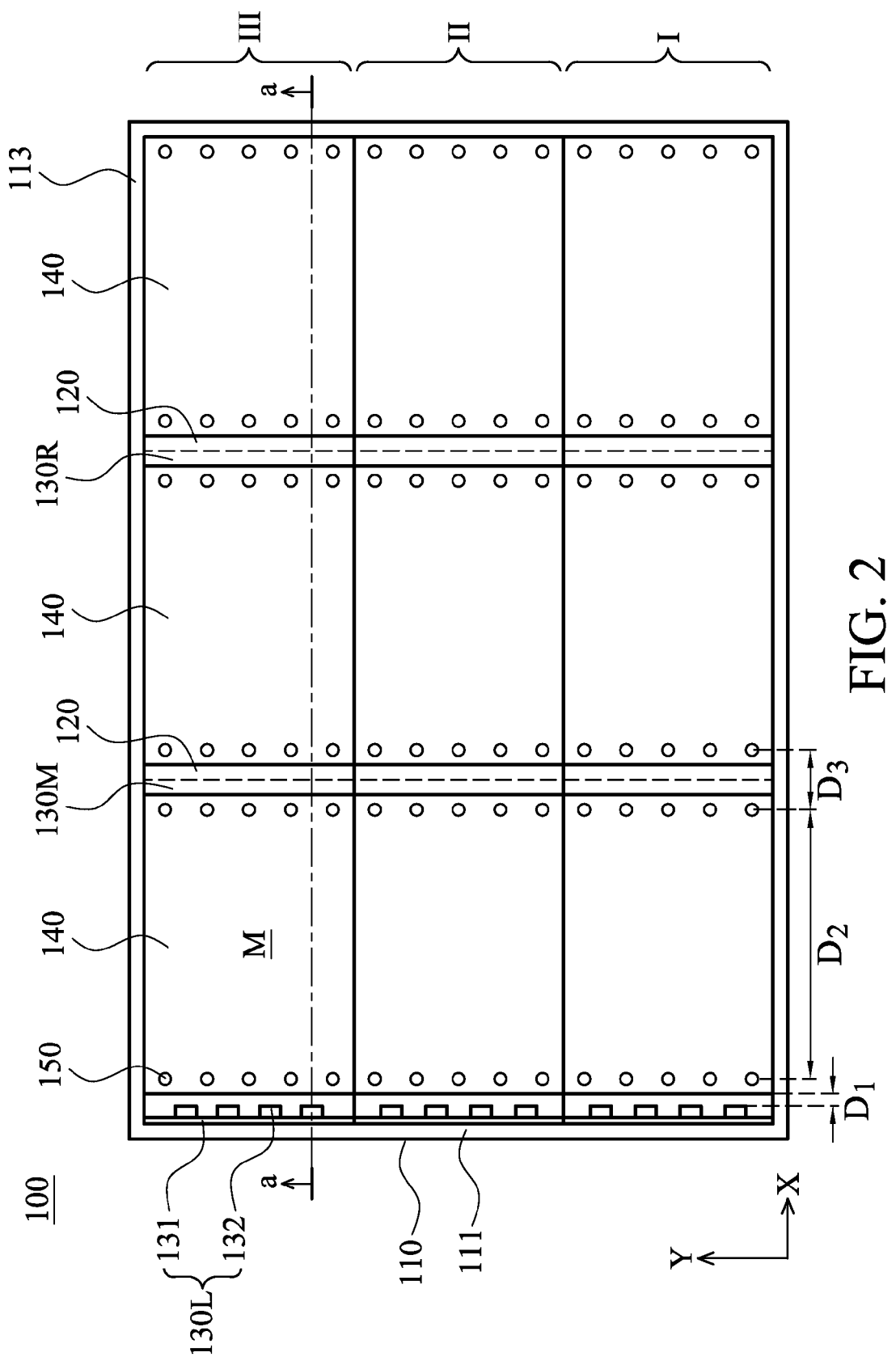
FIG. 2 depicts a top view of the multi-domain dynamic-driving backlight module in accordance with a first embodiment of the invention.
Figure 5:
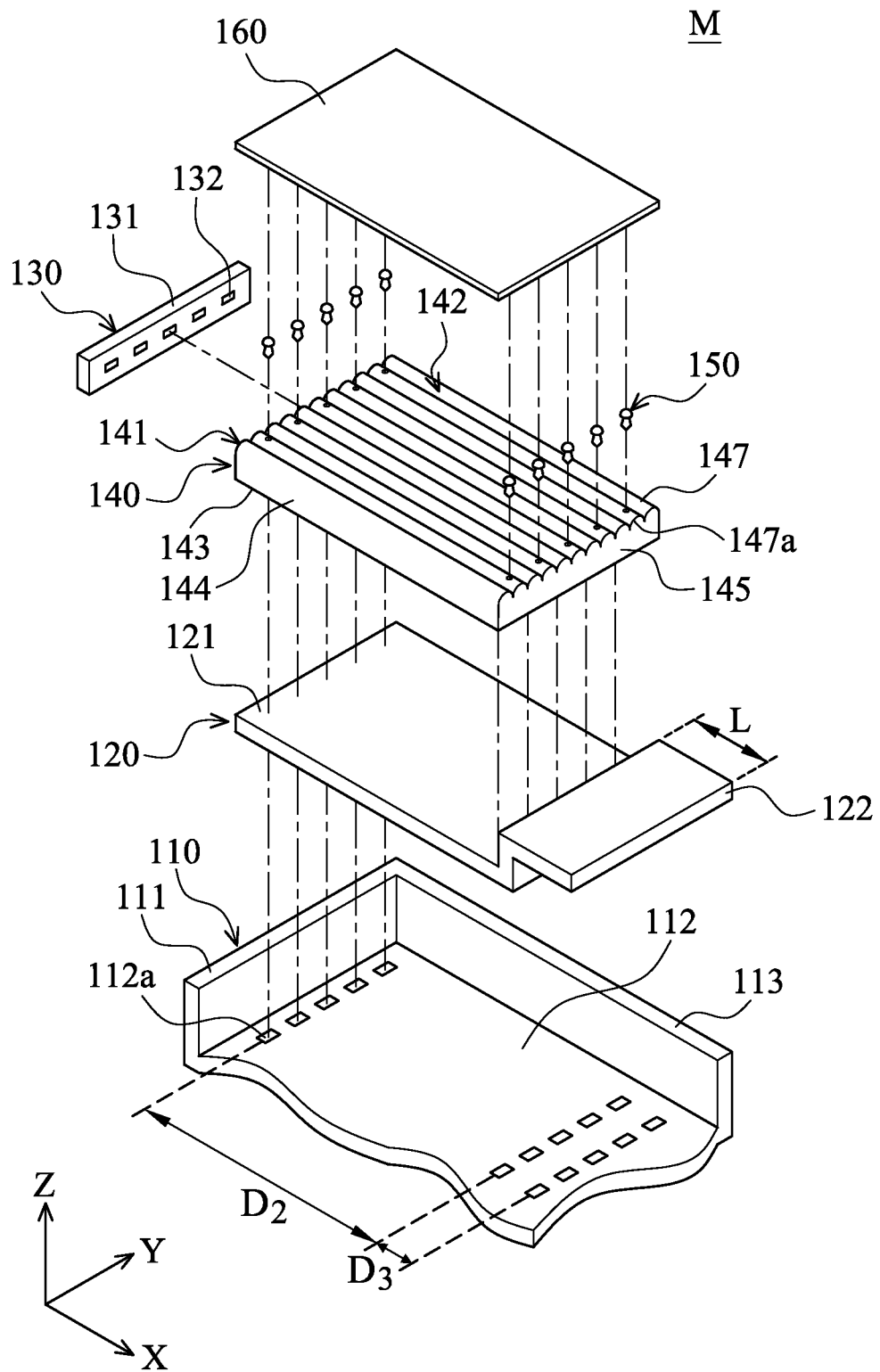
FIG. 5 depicts a exploded view of elements in the M region of FIG. 2.
Figure 6A:
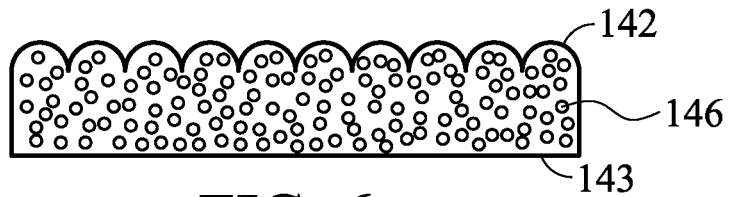
FIGS. 6A-6C depict cross-sectional view of light guide plates of the invention.

Please refer to FIGS. 4-5 and 6A, wherein FIG. 5 shows an exploded view of elements in the M region in FIG. 2, and FIG. 6A is a cross-sectional view of the light guide plate 140 in accordance with the first embodiment of present invention. The light guide plates 140 are disposed on the reflective plates 120 and 120', and each of the light guide plates 140 includes a light incident surface 141, a light emitting surface 142, a bottom surface 143, two long sides 144, two short sides 145, and a plurality of diffusion particles 146. The light emitting surface 142 is adjacent to the light incident surface 141, and the bottom surface 143 is opposite to the light emitting surface 142 and connected to the reflective plates 120 or 120'. The light emitting surface 142 of each of the light guide plates 140 faces the light projection direction of the light emitting units 130 to receive light therefrom. The long sides 144 extend in the predetermined direction (X direction), and the short sides 145 are connected between the long sides 144.

Figure 6B:
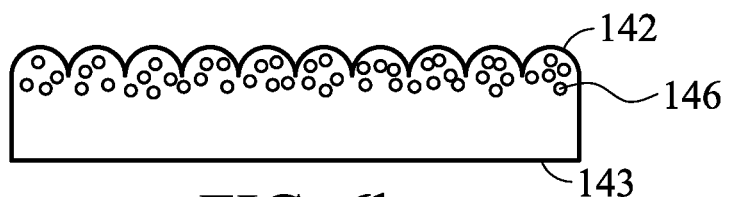
Figure 6C:
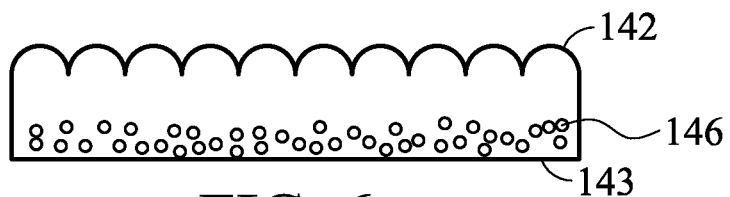

Diffusion particles 146 are randomly dispersed in the light guide plate 140 to diffuse light passing through the light guide plate 140. The position where the diffusion particles 146 are dispersed is not limited. As shown in FIG. 6B, the diffusion particles 146 are dispersed in a region near the light emitting surface 142. Alternatively, as shown in FIG. 6C, the diffusion particles 146 are dispersed in a region near the bottom surface 143.

In one exemplary embodiment, the light emitting surface 142 of the light guide plate 140 includes a patterned surface 147, which includes a plurality of patterned structures 147a. Specifically, at a cross-section parallel to the light incident surface 141 (Y-Z plane), the patterned structures 147 consist of a plurality of lenticular embosses which are consecutively arranged and extend in the light projection direction (X direction) of the LEDs 132. Through the patterned structures 147, light emitted from the light emitting surface 142 can be concentrated, so that a light concentration result is achieved.

It is noted that parts of the light guide plates 140 which are adjacent to the light emitting units 130M or 130R are disposed in the chamber S; thus, the phenomena where hotspots generated thereat are reduce due to shields produced by the second segments 133b of the reflective plate 120, and image quality is enhanced. On the other hand, because of the reflection property of the second segment 122b of each of the reflective plates 120, light is prohibited from being emitted from the slit formed between the second segment 122b of each of the reflective plates 120 and the light guide plate 140.

Please refer to FIGS. 2 and 5. The bezel 110 is a rectangular housing, having two short sides 111, a bottom surface 112, and two long sides 113. The two short sides 111 are connected to the two long sides 113, respectively, and the bottom surface 112 is adjacent to the two short sides 111 and the two long sides 113. On the bottom surface 112, a plurality of positioning holes 112a having a spaced apart relationship are arranged in row parallel with the short side 111. Similarly, the other positioning holes 112a are arranged in other row parallel with the short side 111 and are spaced apart from said row of positioning holes 112a by a distance D2. Once again, still the other positioning holes 112a are arranged in other row parallel with the short side 111 and spaced apart from the neighboring positioning holes 112a by a distance D3.

Figure 7:
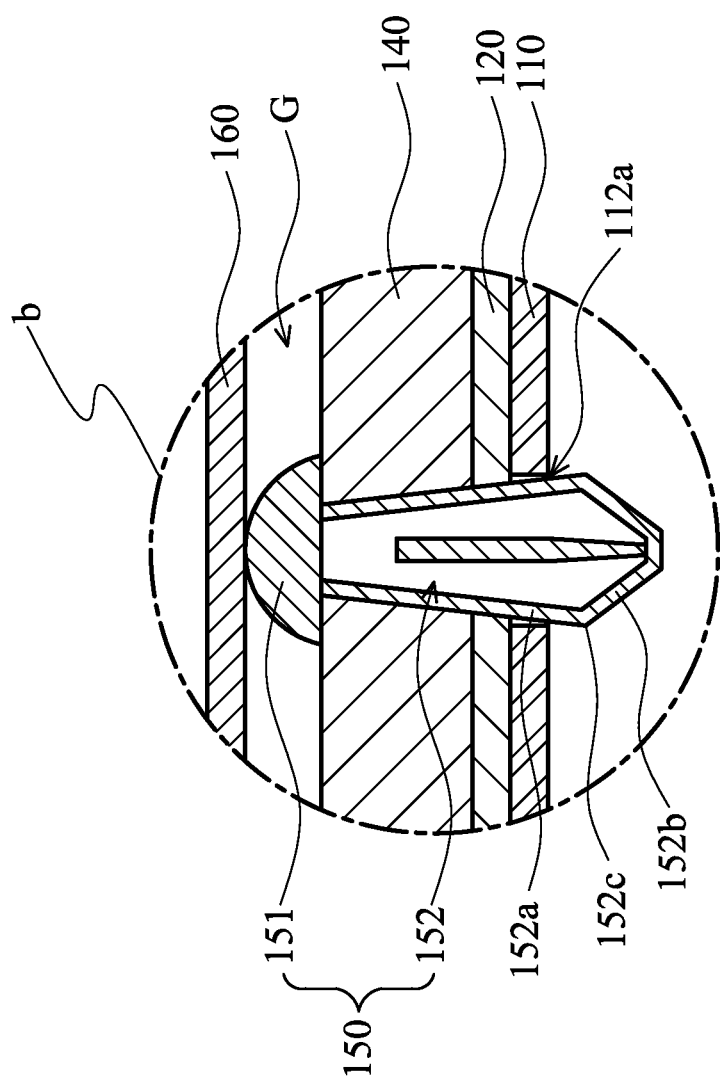
FIG. 7 depicts a magnifying diagram of elements in the b region of FIG. 4.

Please refer to FIG. 7, the bezel 110, the reflective plates 120 or 120' and the light guide plates 140 are assembled by the bolts 150. Each of the bolts 150 includes a head portion 151 and a shaft portion 152, wherein a thickness of the head portion 151 is formed in the longitudinal direction of the bolts 150, and the shaft portion 152 is a hollow structure. The shaft portion 152 includes an engaging segment 152a, a penetrating segment 152b, and a waist segment 152c, wherein the waist segment 152c is located between the engaging segment 152a and the penetrating segment 152b, and the width of the waist segment 152c is larger than that of the engaging segment 152a and the penetrating segment 152b. The bolts 150 are preferably made of material consisting of resin with light transmission property and capable of being flexibly deformed once the bolt 150 is compressed inwardly by an external force.

While assembly, the light guide plate 140, the reflective plates 120 or 120' are penetrated orderly by the penetrating segment 152b of the bolt 150, and then the penetrating segment 152b of the bolt 150 passes through one of the positioning holes 112a of the bezel 110 and disposed therein. Because the distances D2 and D3 between the positioning holes 112a are set in advance, the reflective plates 120 or 120' and the light guide plates 140 can be accurately positioned on the bezel 110, the distance D1 between the light guide plate 140 and the LEDs 130 can be limited. In addition, because the width of the waist segment 152c is larger than that of the positioning holes 112a, after the waist segment 152c passes through the positioning holes 112a, the engaging segment 152a is firmly engaged with the bezel 110, the reflective plate 120 or 120', and the light guide plate 140, whereby there is no air gap formed between the reflective plates 120 or 120' and the light guide plate 140.

The diffusion plate 160 is corresponding to the light emitting surface 142 of the light guide plate 140 and disposed on the top end of the head portion 151 of each of the bolts 150, such that an air gap G is formed between the light emitting surface 142 of the light guide plate 140 and the bottom surface 160a of the diffusion plate 160. Therefore, a light beam with an overtly wide viewing angle can then be refracted back for reuse at the interface of the light guide plate 140 and the air gap G, and thus reduce unnecessary energy consumption.

Figure 8:
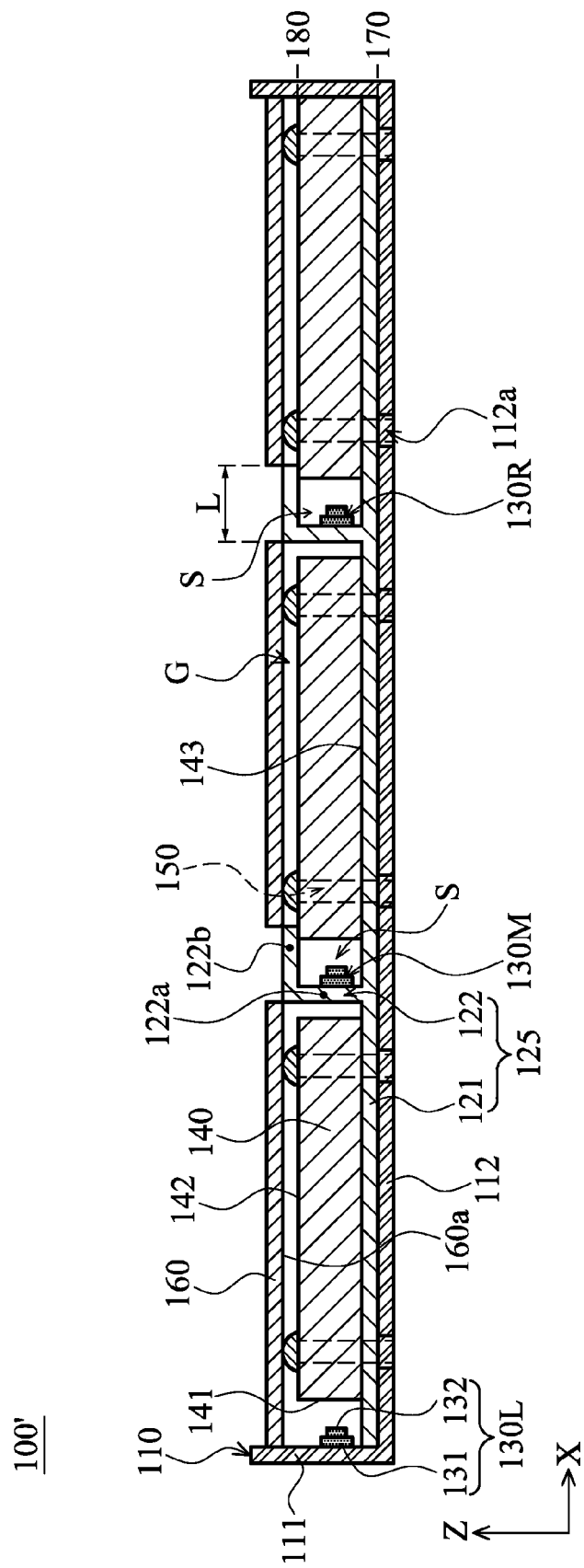
FIG. 8 depicts a cross-sectional view of a multi-domain dynamic-driving backlight module in accordance with a second embodiment of the invention.

Please refer to FIG. 8, which shows a cross-sectional view of a second embodiment of a multi-domain dynamic-driving backlight module 100'. A difference with the multi-domain dynamic-driving backlight module 100 is that the reflective plate 125 of the multi-domain dynamic-driving backlight module 100' is formed integrally, wherein a plurality of extension portions 122 extend upwardly from a base portion 121 of the reflective plate 125.

Figure 9:
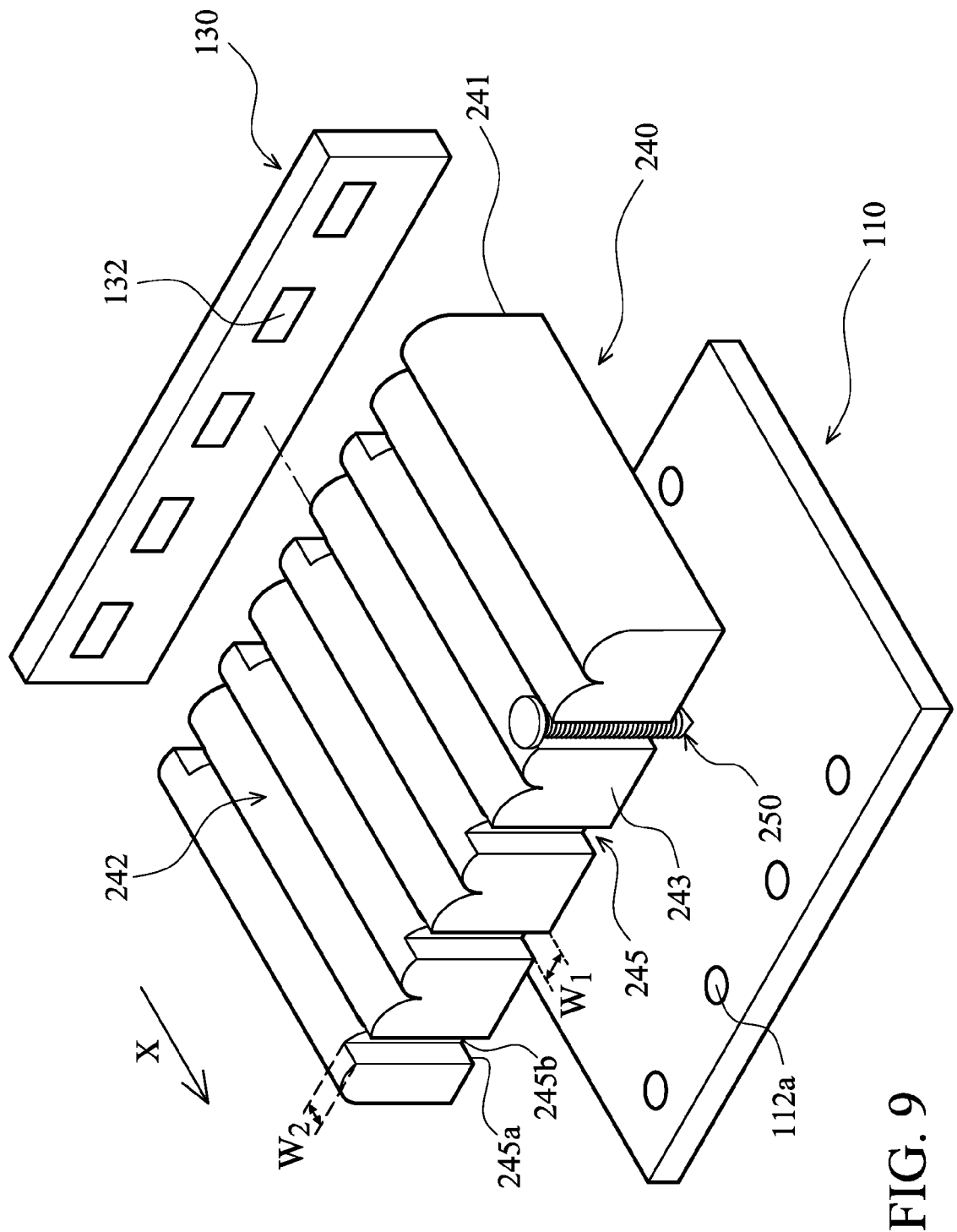
FIG. 9 depicts a schematic view of partial elements of a multi-domain dynamic-driving backlight module in accordance with a third embodiment of the invention.

Please refer to FIG. 9, which shows a schematic view of partial elements of a third embodiment. In FIG. 9, some of the positioning elements 250 are omitted to show the slots 245 of the light guide plates 240.

In order to increase productivity and ensure production quality, the slots 245 are in advance formed on a light incident surface 241 and a side surface 243 opposite to the light incident surface 241 of the light guide plate 240 for allowing the positioning elements 250 to pass therethrough, wherein each of the slots 245 corresponds to one of the positioning holes 112a of the bezel 110. The positions where the slots 245 on a light incident surface 241 is formed are interspersed with the positions where the LEDs 132 of the light emitting units 130 are disposed.

Each of the slots 245 has two small sides 245a and a large side 245b located between the two small sides 245a, wherein the manufacturing tolerance $W_2$ of each of the large sides 245b is larger than the manufacturing tolerance $W_1$ of the each of the small sides 245a, thereby damage resulting from thermal expansion between the light guide plate 240 and the positioning elements 250 can be prevented.

In one exemplary embodiment, the positioning elements 250 are screws, wherein the screws 250 pass through the light guide plate 240 and positioning holes 112a and are connected to nuts (not shown) disposed behind the bezel 110 to position the light guide plate 240.

Through the features where the light emitting units disposed in different regions of the multi-domain dynamic-driving backlight module of the present invention can be controlled independently and the patterned surface is formed on the light emitting surface of the light guide plate which increases image uniformity and contrast ratio, the drawbacks in the prior art can be overcome.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-domain dynamic-driving backlight module, comprising:
   a bezel;
   a reflective plate, disposed on the bezel;
   a plurality of light emitting units; and
   a plurality of light guide plates, respectively having a short side and a long side, extending in a predetermined direction, and respectively comprising:
      a light incident surface, facing the light projection direction of the light emitting units;
      a light emitting surface, adjacent to the light incident surface; and
      a bottom surface, opposite to the light emitting surface and connected to the reflective plate,
   wherein each of the light emitting surfaces comprises a patterned surface comprising a plurality of patterned structures extending in a direction parallel to the light projection direction of the light emitting units.

2. The multi-domain dynamic-driving backlight module as claimed in claim 1, wherein each of the light guide plates comprises a plurality of diffusion particles dispersed between the light emitting surface and the bottom surface.

3. The multi-domain dynamic-driving backlight module as claimed in claim 1, wherein the number of the reflective plate is more than one, and the reflective plates are arranged on a first plane in the predetermined direction.

4. The multi-domain dynamic-driving backlight module as claimed in claim 3, wherein at least one of the reflective plates comprises an extension portion extending from the first plane in a direction away from the bezel to a second plane.

5. The multi-domain dynamic-driving backlight module as claimed in claim 4, wherein the extension portions are disposed between the adjacent light guide plates.

6. The multi-domain dynamic-driving backlight module as claimed in claim 5, wherein each of the extension portions on the second plane further extends for a predetermined distance in the predetermined direction.

7. The multi-domain dynamic-driving backlight module as claimed in claim 6, wherein a plurality of chambers is respectively defined between one of the extension portions and the other reflective plate adjacent to the extension portion, and some of the light emitting units are disposed in the chambers.

8. The multi-domain dynamic-driving backlight module as claimed in claim 7, wherein parts of the light guide plates are disposed in the chambers.

9. The multi-domain dynamic-driving backlight module as claimed in claim 1, wherein the patterned structure comprises a plurality of lenticular embosses, and the lenticular embosses extend in a direction parallel to the predetermined direction.

10. The multi-domain dynamic-driving backlight module as claimed in claim 1 further comprising a plurality of bolts, and the bezel comprises a plurality of positioning holes, wherein the bolts are respectively passed through the light guide plates, the reflective plate and the positioning holes so as to position the light guide plates and the reflective plate on the bezel.

11. The multi-domain dynamic-driving backlight module as claimed in claim 10, further comprising a diffusion plate, corresponding to the light emitting surfaces of the light guide plates and disposed on the bolts, wherein an air gap is formed between the light guide plates and the diffusion plate.

12. The multi-domain dynamic-driving backlight module as claimed in claim 10, wherein the light emitting unit comprises a plurality of LEDs, and the positions where the bolts are disposed are interspersed with the positions where the LEDs are disposed.

13. The multi-domain dynamic-driving backlight module as claimed in claim 1, wherein the bezel comprises a plurality of positioning holes, and the light guide plates respectively comprise a plurality of slots corresponding to the positioning holes, wherein the slots are disposed on the light incident surface of the light guide plate and a side surface opposite to the light incident surface.

14. The multi-domain dynamic-driving backlight module as claimed in claim 13, wherein each of the slots has two small sides and a large side located between the two small sides, and the manufacturing tolerance of the large side of each of the slots are larger than the manufacturing tolerance of the two small sides of each of the slots.

* * * * *